US010979545B2

United States Patent
Chen et al.

(10) Patent No.: US 10,979,545 B2
(45) Date of Patent: Apr. 13, 2021

(54) FUNCTIONAL ASSEMBLY AND ELECTRONIC DEVICE

(71) Applicant: ASUSTeK COMPUTER INC., Taipei (TW)

(72) Inventors: Chui-Hung Chen, Taipei (TW); Ching-Yuan Yang, Taipei (TW); Cheng-Han Chung, Taipei (TW); Chia-Min Cheng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/540,261

(22) Filed: Aug. 14, 2019

(65) Prior Publication Data
US 2020/0059542 A1  Feb. 20, 2020

(30) Foreign Application Priority Data

Aug. 15, 2018 (TW) ................................ 107211174
Oct. 26, 2018 (TW) ................................ 107214610

(51) Int. Cl.
*H04M 1/00* (2006.01)
*H04M 1/02* (2006.01)
*G06F 1/16* (2006.01)

(52) U.S. Cl.
CPC ........ *H04M 1/0264* (2013.01); *G06F 1/1677* (2013.01); *G06F 1/1683* (2013.01); *H04M 1/0241* (2013.01)

(58) Field of Classification Search
CPC .... H04M 1/0214; H04M 1/23; H04M 1/0247; H04M 1/0237; H04M 1/0235; H04M 1/0245; H04M 1/72519; H04M 1/72522; H04W 88/02
USPC ............... 455/575.1, 575.4, 90.3, 550.1
See application file for complete search history.

(56) References Cited

U.S. PATENT DOCUMENTS

| 2014/0135071 A1* | 5/2014 | Lee ..................... H04M 1/0266 455/566 |
| 2016/0098138 A1* | 4/2016 | Park ..................... G06F 3/0416 345/173 |
| 2016/0165027 A1* | 6/2016 | Hahn ..................... H04B 1/38 455/566 |

FOREIGN PATENT DOCUMENTS

| CN | 203984539 U | 12/2014 |
| CN | 105049686 A | 11/2015 |

\* cited by examiner

*Primary Examiner* — Temica M Beamer
(74) *Attorney, Agent, or Firm* — McClure, Qualey & Rodack, LLP

(57) ABSTRACT

A functional assembly is provided. The functional assembly includes a functional module and a lifting assembly. The lifting assembly is fixed in the housing and configured to drive the functional module to move. In addition, the functional assembly further includes a rotating assembly. The rotating assembly is connected to the functional module.

22 Claims, 12 Drawing Sheets

FUNCTIONAL ASSEMBLY AND ELECTRONIC DEVICE

CROSS-REFERENCE TO RELATED APPLICATION

This application claims the priority benefit of Taiwan applications serial No. 107211174 filed on Aug. 15, 2018, and serial No. 107214610 filed on Oct. 26, 2018. The entirety of the above-mentioned patent application is hereby incorporated by reference herein and made a part of specification.

BACKGROUND OF THE INVENTION

Field of the Invention

The invention relates to a functional assembly for an electronic device.

Description of the Related Art

Nowadays, the mobile phone industry trends to a full screen design, which gradually compresses the allocation area of the related functional modules. Thus it is a challenge to arrange the functional modules inside the limited space of an electronic device.

BRIEF SUMMARY OF THE INVENTION

According to the first aspect of the disclosure, a functional assembly is provided. The functional assembly is applied to an electronic device. The electronic device comprises a housing. The functional assembly comprises: a functional module; and a lifting assembly, fixed in the housing and configured to drive the functional module to move.

According to the second aspect of the disclosure, an electronic device is provided. The electronic device comprises: a housing; and a functional assembly, comprising: a functional module, slidably connected with the guiding structure; and a lifting assembly, fixed in the housing and configured to drive the functional module to move.

In the above embodiment of the disclosure, the functional assembly includes both the lifting assembly and the rotating assembly. In this way, the functional module is raised by the lifting assembly, and after the functional module is raised, it is rotated by the rotating assembly. Therefore, it is possible to save space, improve the specifications of the functional module, and enable the functional module to switch modes.

These and other features, aspects and advantages of the present invention will become better understood with regard to the following description, appended claims, and accompanying drawings.

DETAILED DESCRIPTION OF THE EMBODIMENTS

Figure 1A:
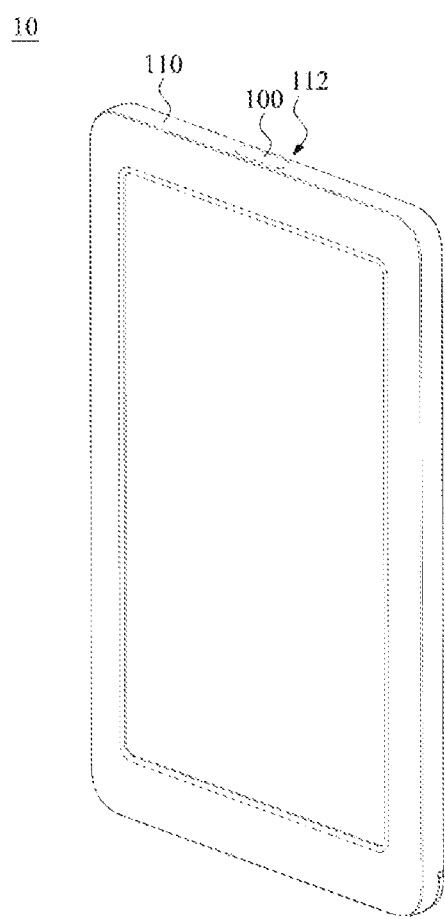
FIG. 1A is a perspective view of a functional assembly in a housing of an electronic device according to an embodiment.

The embodiments of the present disclosure are disclosed in the following drawings, and for the sake of clarity, the details of the invention will be described in the following description. However, it should be understood that these practical details are not intended to limit the disclosure. That is, in some embodiments of the disclosure, these practical details are not necessary. In addition, some of the conventional structures and elements are shown in the drawings in a simplified schematic manner in order to simplify the drawings. The thickness of layers and regions in the drawings may be exaggerated for clarity and the same elements in the description of the drawings represent the same elements.

Figure 1B:
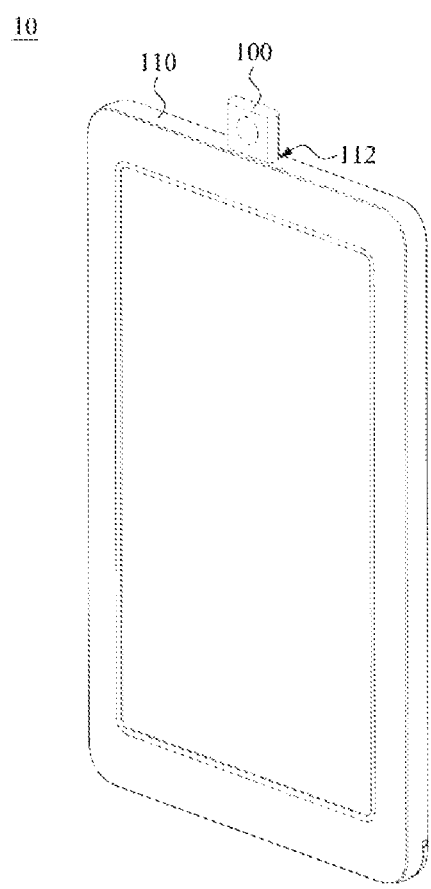
FIG. 1B is a perspective view of the functional assembly of FIG. 1A extending out of the housing of the electronic device 10.
Figure 1C:
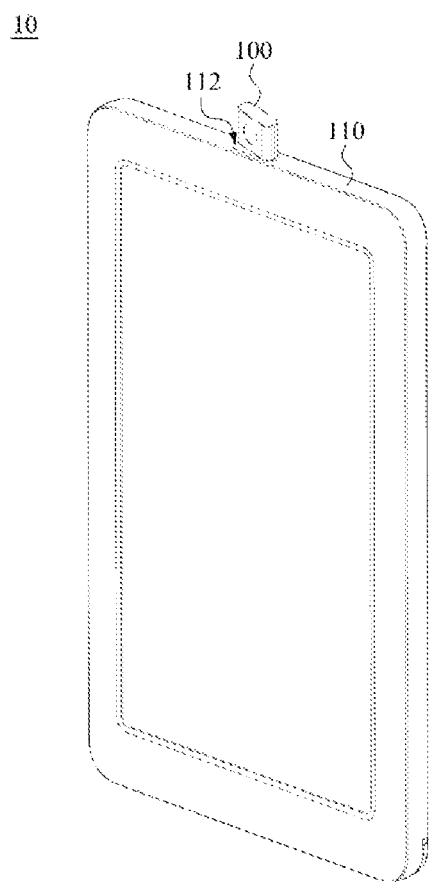
FIG. 1C is a perspective view of the functional assembly of FIG. 1B extending out of the housing and rotating relative to the housing.

As shown in FIG. 1A to FIG. 1C, an electronic device 10 includes a functional assembly 100 and a housing 110. The housing 110 includes an opening 112. In an embodiment, the functional assembly 100 is able to be pop-up and rotate at its lifted position. As shown in FIG. 1A, when the functional assembly 100 is retracted, the functional assembly 100 is located within the housing 110, and most of the functional assembly 100 is inside the housing 110. As shown in FIG. 1B, when the functional assembly 100 is raised, most of the functional assembly 100 is outside the housing 110. As shown in FIG. 1C, the functional assembly 100 is rotated relative to the housing 110 after it is raised.

Figure 2:
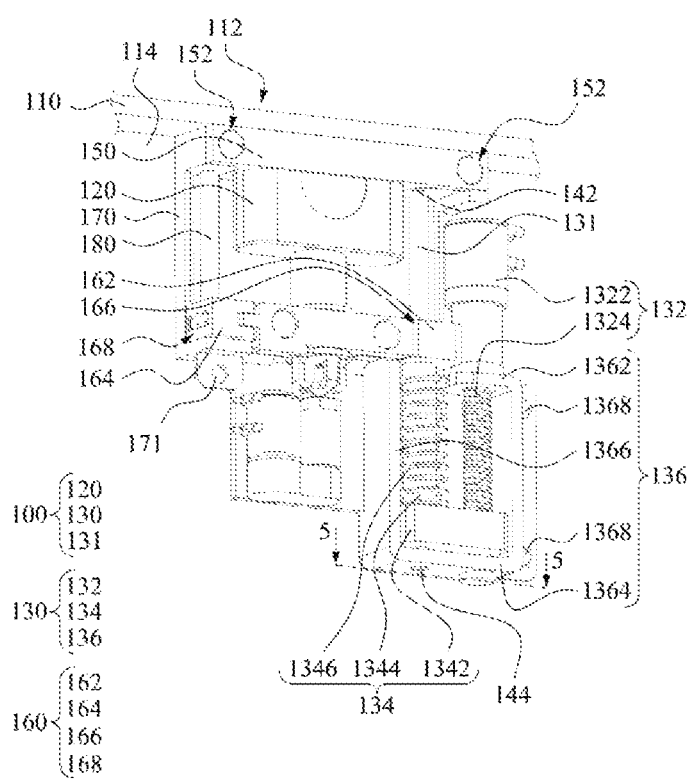
FIG. 2 is a perspective view of the functional assembly in FIG. 1A.
Figure 3:
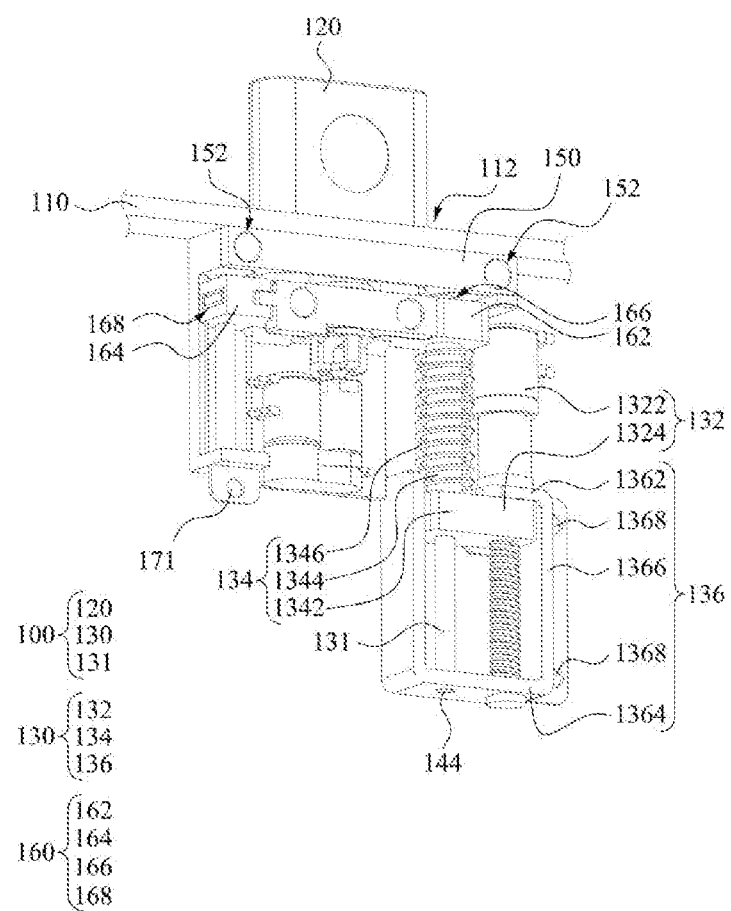
FIG. 3 is a perspective view of the functional assembly in FIG. 1B.
Figure 4:
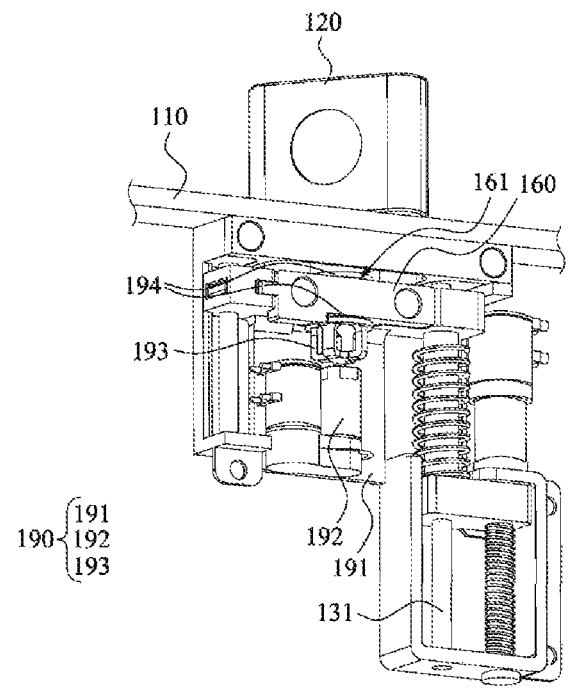
FIG. 4 is a perspective view of the functional assembly in FIG. 1C.

FIG. 2 is a perspective view of the functional assembly in FIG. 1A. FIG. 3 is a perspective view of the functional assembly in FIG. 1B. FIG. 4 is a perspective view of the functional assembly in FIG. 1C. Please refer to FIG. 2 and FIG. 3. As shown in FIG. 2 and FIG. 3, the functional assembly 100 includes a functional module 120 and a lifting assembly 130.

In an embodiment, the functional module 120 is a camera module, a flash module, or a sensor. The lifting assembly 130 includes a guiding structure 131, a driver 132 (such as a motor or a solenoid switch), and a transmitting structure 134. The driver 132 includes a body 1322 and a rotating shaft 1324. The transmitting structure 134 includes a driving member 1342, a driving collar 1344, and an elastic element 1346 (for example, a spring, an elastic plate, an elastic washer, which is not limited thereto). The guiding structure 131 has a first end 142 and a second end 144. The functional module 120 and the body 1322 of the driver 132 are adjacent to the first end 142 of the guiding structure 131. The transmitting structure 134 and the rotating shaft 1324 of the driver 132 are adjacent to the second end 144 of the guiding structure 131. Both the functional module 120 and the transmitting structure 134 are slidably connected to the guiding structure 131.

Figure 5:
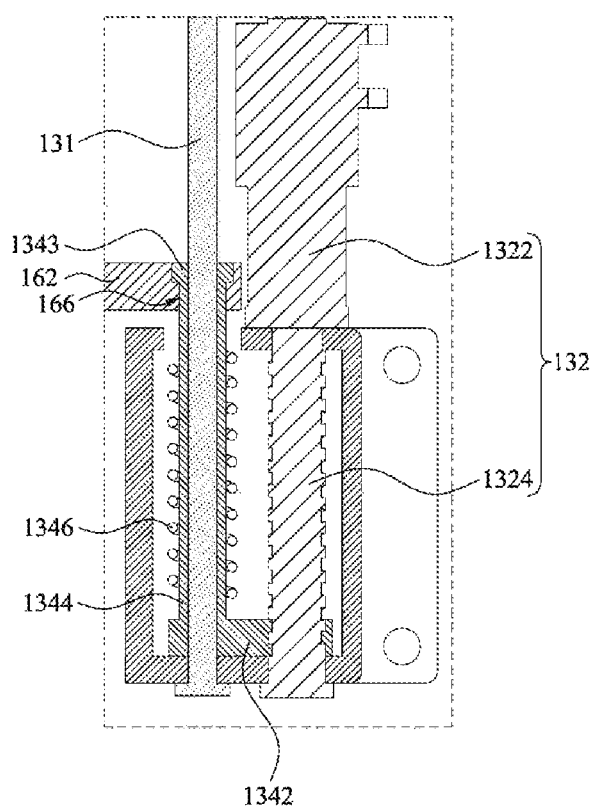
FIG. 5 is a partial cross-sectional view of the structure of FIG. 2 taken along line 5-5.

Please refer to FIG. 5. FIG. 5 is a partial cross-sectional view of the structure of FIG. 2 taken along line 5-5. As shown in FIG. 2, FIG. 3, and FIG. 5, the driving member 1342, the driving collar 1344, and the elastic element 1346 are sleeved on the guiding structure 131. In an embodiment, the driving member 1342 is connected to one end of the driving collar 1344. As shown in FIG. 5, the driving member 1342 and the driving collar 1344 are integrally formed. In other embodiments, the driving member 1342 and the driving collar 1344 are detachable. In some embodiments, the driving member 1342 is engaged to one end of the driving collar 1344. As shown in FIG. 5, the driving collar 1344 extends from the driving member 1342 along the guiding structure 131 toward the functional module 120 (such as extending upward in FIG. 5) and protrudes from the elastic element 1346, and the elastic element 1346 movably surrounds the driving collar 1344. In this embodiment, the driving collar 1344 is a sleeve structure located outside the guiding structure 131 and inside the elastic element 1346. Specifically, the body 1322 of the driver 132 drives the driving member 1342 to push the driving collar 1344 and the elastic element 1346, and thus the entire transmitting structure 134 is moved along the guiding structure 131.

Please refer back to FIG. 2. As shown in FIG. 2, the functional module 120 connects with or abuts the transmitting structure 134. Specifically, the functional module 120 abuts the elastic element 1346 of the transmitting structure 134 or connects to the elastic element 1346 via an additional connecting structure. Thus, when the entire transmitting structure 134 moves along the guiding structure 131, the transmitting structure 134 simultaneously drives the functional module 120 to move along the guiding structure 131. The function of the elastic element 1346 is to cushion the force of a user pressing the functional module 120 from the outside of the housing 110 and prevent the functional assembly 100 or the driver 132 from damage. The specific connection manner of the functional module 120 and the guiding structure 131 will be described below.

As shown in FIG. 2, the functional assembly 100 further includes an extending element 160 connected to the functional module 120. In an embodiment, the extending element 160 is a flat structure connected to a bottom of the functional module 120, and the bottom of the functional module 120 is facing the interior of the electronic device 10. The shape of the extending element 160 and the fixing manner and position of the functional module 120 are merely for example, which are not limited herein. The extending element 160 has a first protruding portion 162 and a second protruding portion 164 which are respectively protruding from opposite sides of the functional module 120. The extending element 160 has a first through hole 166 and a second through hole 168. The first through hole 166 penetrates through the first protruding portion 162, and the second through hole 168 penetrates through the second protruding portion 164. The guiding structure 131 slidably passes through the first through hole 166.

Please refer to FIG. 5. In the embodiment, the driving collar 1344 sleeves the guiding structure 131, and extends from the second end 144 to and connects to the first protruding portion 162 of the extending element 160. In the embodiment, the driving collar 1344 includes a cap portion 1343 at one end of the driving collar 1344 away from the driving member 1342, and the inner diameter of one end of the first through hole 166 near the driving member 1342 is equal to the outer diameter of the central portion of the driving collar 1344, and the inner diameter of another end of the first through hole 166 away from the driving member 1342 is equal to the outer diameter of the cap portion 1343 of the driving collar 1344. That is, the driving collar 1344 has a limiting function that prevent the extending element 160 from moving toward the opening 112 (not shown, located above FIG. 5) when the extending element 160 is not driven by the transmitting structure 134.

As shown in FIGS. 2 and 3, when the lifting assembly 130 pushes the functional module 120 out of the housing 110, the body 1322 of the driver 132 rotates and drivers the rotating shaft 1324 to rotate, and the threaded locking relationship between the driving member 1342 and the rotating shaft 1324 causes the driving member 1342 to move upward. Since the driving member 1342 and the driving collar 1344 are fixed to each other, the driving member 1342 drives the driving collar 1344 to move upward, and then the driving collar 1344 pushes the elastic element 1346, so that the entire transmitting structure 134 moves toward the first end 142 of the guiding structure 131 along the guiding structure 131. Then, the elastic element 1346 pushes the extending element 160 and the functional module 120, such that the extending element 160 and the functional module 120 slide along the guiding structure 131 and cause the functional module 120 to protrude from the housing 110 through the opening 112. When the lifting assembly 130 retracts the functional module 120 into the housing 110, the body 1322 of the driver 132 rotates and drives the rotating shaft 1324 to rotate, and the threaded locking relationship between the driving member 1342 and the rotating shaft 1324 causes the driving member 1342 move downward. Since the driving member 1342 and the driving collar 1344 are engaged with each other, the driving member 1342 drives the driving collar 1344 downward. Since the driving collar 1344 is fixed to the first protruding portion 162 of the extending element 160, the driving collar 1344 pulls the extending element 160 and the functional module 120 to move along the guiding structure 131 toward the second end 144, and causes the functional module 120 to be retracted into the housing 110 through the opening 112.

According to the above, the functional module 120 and the lifting assembly 130 are integrated by the guiding structure 131. In this way, by integrating a guide rail structure required for a conventional motor drive with a sliding structure required for the sliding functional module 120 to be a shared guiding structure 131, the overall size of the lifting assembly 130 is reduced. In addition, since the body 1322 of the driver 132 of the lifting assembly 130 is adjacent to the functional module 120, the structural configuration of the functional assembly 100 is more concentrated, and the volume of the functional assembly 100 is further reduced.

Furthermore, since the driving collar 1344 movably connected to the extending element 160 or the functional module 120, it is possible to avoid that the functional module 120 sliding out of the housing 110 due to gravity or inertia when the user turning the electronic device 10 upside down or tilting the electronic device 10. Therefore, the functional module 120 is stably driven back or forth by the lifting assembly 130 to retract inside or extend outside the housing 110. Besides, the function of the elastic element 1346 about cushioning the user's pressing is not affected by the blocking relationship between the driving collar 1344 and the extending element 160 or the functional module 120.

Please refer to FIG. 1C and FIG. 4. As shown in FIG. 1C and FIG. 4, in an embodiment, after the functional module 120 is moved up and extending out of the housing 110, the functional module 120 rotates at least 180 degrees or greater than 180 degrees. In particular, the functional assembly 100 also includes a rotating assembly 190 configured to rotate the functional module 120. The rotating assembly 190 is disposed inside the housing 110 and moves relative to the housing 110.

As shown in FIG. 4, the rotating assembly 190 includes a fixing plate 191, a driver 192, and a connecting shaft 193. The fixing plate 191 is fixed to one side of the extending element 160 opposite to the functional module 120. The driver 192 is disposed on the fixing plate 191. The connecting shaft 193 is connected between the driver 192 and the functional module 120. When the driver 192 is actuated, the connecting shaft 193 is drove to rotate by the driver 192.

In the embodiment, the center of the extending element 160 further has a central through hole 161, and the connecting shaft 193 penetrate through the central through hole 161. Specifically, the connecting shaft 193 includes two cap portions 194 respectively disposed on the upper and lower sides for clamping the extending element 160, such that the extending element 160 and the connecting shaft 193 are fixed to each other in the extending direction of the guiding structure 131. That is, the connecting shaft 193 and the extending element 160 are relatively rotatable, but are not detachable.

As shown in FIG. 4, the connecting shaft 193 is passed through the central through hole 161 of the extending element 160 and is connected to one end of the functional module 120 that is closer to the extending element 160. The connecting shaft 193 and the functional module 120 are fixed to each other, such that the functional module 120 rotates together as the connecting shaft 193 rotates.

In an embodiment, the fixing plate 191 is a circuit board and is configured to fix the wires of the functional module 120. In an embodiment, the wires of the functional module 120 is passed through the central through hole 161 of the extending element 160 and fixed to the fixing plate 191, and then the wires of the functional module 120 are connected to the processor, battery, or other electronic components of the electronic device 10.

In an embodiment, the functional module 120 includes a lens. When the electronic device 10 is in the state shown in FIG. 3, the lens of the functional module 120 faces the rear or the front of the electronic device 10. When the user wants to change the direction in which the lens of the functional module 120 faces, he or she actuates the driver to rotate the functional module 120 by inputting an instruction to the electronic device 10. In an embodiment, when the functional module 120 is rotated by 180 degrees, the lens of the functional module 120 faces the front or the rear of the electronic device 10.

In other words, one functional module 120 meets the shooting needs in different directions. In fact, the lens of the functional module 120 serves as both a front lens and a rear lens of the electronic device 10 to greatly reduce the occupation of the space inside the electronic device 10. In addition, since one lens of the functional module 120 serves as both a front lens and a rear lens of the electronic device 10, the lens of the functional module 120 can be a lens with a higher specification, and the electronic device 10 obtains the same image quality while capturing a front image and a rear image.

The main functions and operating principles of the electronic device 10 is described in detail above. However, it should be understood that various components can be added to the electronic device 10 according to practical requirements to promote operational efficiency. It will be described in detail below with reference to FIG. 2 and FIG. 3.

Please refer back to FIG. 2 and FIG. 3. The functional assembly 100 also includes a fixed guiding element 150 configured to fix to the housing 110. The fixed guiding element 150 sleeves the functional module 120. In the embodiment, the first end 142 of the guiding structure 131 is fixed via a hole position on the fixed guiding element 150. In addition, the fixed guiding element 150 has screw holes 152 at two ends thereof, and the fixed guiding element 150 is fixed to the housing 110 by screws, which is not limited herein. In the embodiment, the fixed guiding element 150 is adjacent to the opening 112 and an inner surface 114 of the housing 110. The fixed guiding element 150 assists the functional module 120 to be limited relative to the guiding structure 131. In such way, in addition to avoiding deviation during assembling of the functional module 120 and the guiding structure 131, it facilitates the integrated functional assembly 100 to be aligned with the opening 112 and installed on the housing 110. The functional module 120 slides via the fixed guiding element 150 and the opening 112 of the housing 110.

The lifting assembly 130 of the functional assembly 100 also includes a frame 136. The frame 136 is fixed inside the housing 110. In the embodiment, the frame 136 has sidewalls 1362, 1364, 1366 that are sequentially connected with each other. The side walls 1362, 1364, 1366 jointly enclose a space for accommodating the rotating shaft 1324 and the transmitting structure 134. The body 1322 of the driver 132 is fixed to the side wall 1362, and the two ends of the rotating shaft 1324 of the driver 132 respectively pass through two opposite side walls 1362, 1364 of the frame 136, and one of the two ends of the rotating shaft 1324 is rotatably connected to the side wall 1364 of the frame 136. In addition, the second end 144 of the guiding structure 131 is fixed to the side wall 1364 of the frame 136. In the embodiment, the frame 136 further has a screw hole 1368, and is fixed to the housing 110 by screws, which is not limited herein.

As described, the functional module 120 and the lifting assembly 130 are integrated via the guiding structure 131, and the first end 142 and the second end 144 of the guiding structure 131 are fixed relative to the functional module 120 and the transmitting structure 134 through the fixed guiding element 150 and the frame 136 of the lifting assembly 130. Therefore, the functional module 120 and the transmitting structure 134 slide along the guiding structure 131 between the first end 142 and the second end 144. Compared with the traditional functional module and the lifting assembly are separated to each other, the functional assembly 100 of the disclosure has high component sharing and needs less fixing components, which avoids problems of component tolerance and assembling, and further reduces the cost.

In the embodiment, the functional assembly 100 also includes an auxiliary fixing element 170. The auxiliary fixing element 170 is fixed to the housing 110. Specifically, the auxiliary fixing element 170 and the fixed guiding element 150 are integrally formed, and the auxiliary fixing element 170 is rod-shaped. One end of the auxiliary fixing element 170 away from the fixed guiding element 150 includes a screw hole 171. The screw hole 171 is fixed to the housing 110 by screws such that the auxiliary fixing element 170 is more stably fixed to the housing 110. A limiting structure 180, opposite the guiding structure 131, is also disposed on the auxiliary fixing element 170. The limiting structure 180 passes through the second through hole 168 of the extending element 160. In General, the limiting structure 180 is parallel to the guiding structure 131, and the functional module 120 is guided by both of the limiting structure 180 and the guiding structure 131 during it is lifted, which effectively prevents the functional module 120 from being yawed during lifting.

In summary, the functional assembly 100 includes both the lifting assembly 130 and the rotating assembly 190. As such, the functional module 120 is raised by the lifting assembly 130 and rotated by the rotating assembly 190 after the functional module 120 is raised. Therefore, the space inside the electronic device 10 is saved, and the specification of the functional module 120 is improved.

Figure 6:
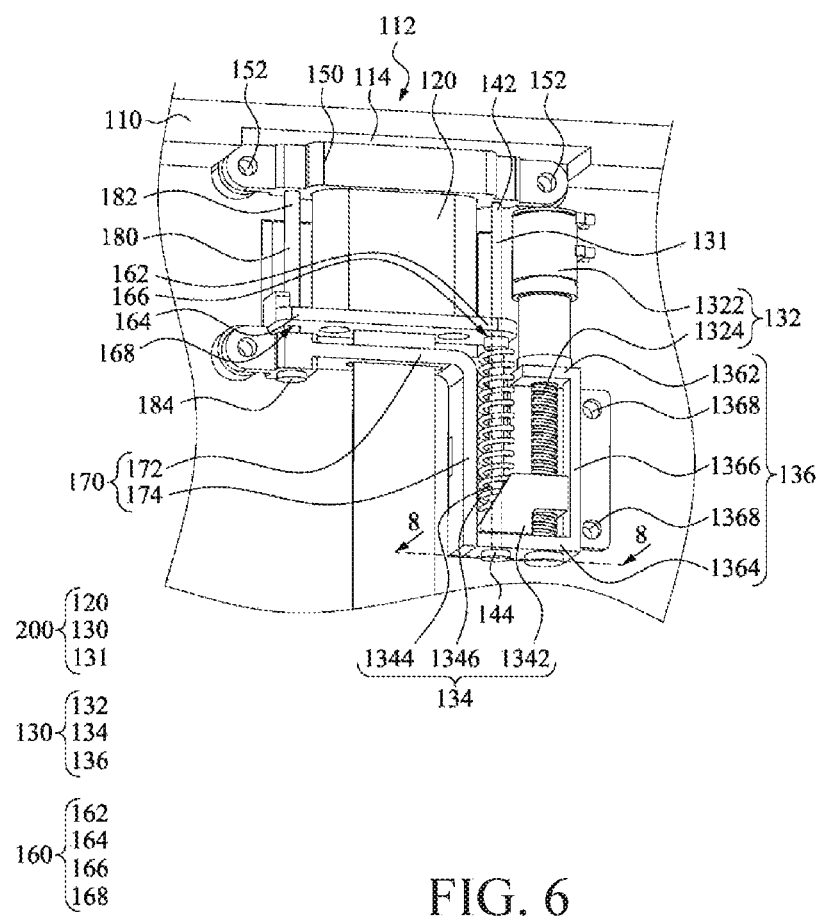
FIG. 6 is a perspective view of a functional assembly in accordance with another embodiment.
Figure 7:
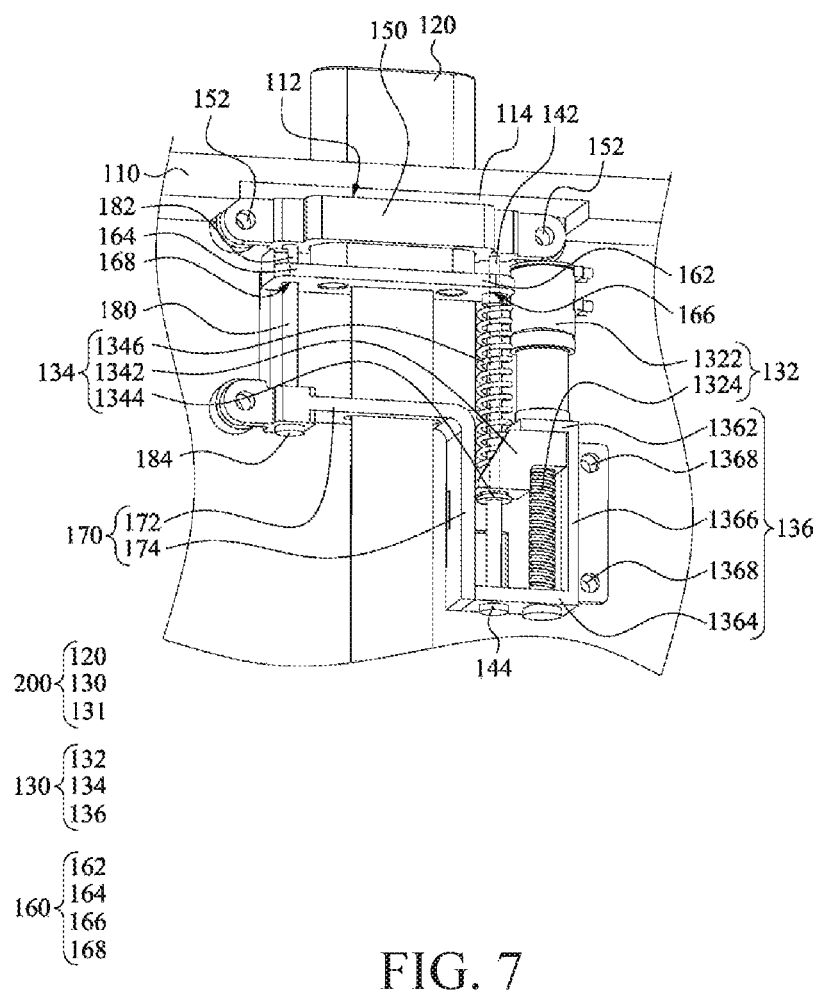
FIG. 7 is a perspective view of a functional module in the functional assembly of FIG. 6 when it is raised.

Next, please refer to FIG. 6 and FIG. 7. FIG. 6 is a perspective view of a functional assembly 200 in accordance with another embodiment. FIG. 7 is a perspective view of a functional module 120 in the functional assembly 200 of FIG. 6 when it is raised. As shown in FIG. 6, the functional assembly 200 includes elements similar to those included in the functional assembly 100 of FIG. 2 to FIG. 5, and the same elements have the same symbols, and the difference is that the rotating assembly 190 of the functional assembly 200 in FIG. 6 is omitted.

As shown in FIG. 6, since the rotating assembly 190 is omitted from the functional assembly 200, the volume of the functional assembly 200 is further reduced. Furthermore, the space originally for the rotating assembly 190 allows accommodating another type of the auxiliary fixing element 170 of the embodiment.

Specifically, as shown in FIG. 6, the auxiliary fixing element 170 is connected to the frame 136 and is fixed inside the housing 110. In the embodiment, the auxiliary fixing element 170 has a first portion 172 and a second portion 174 connected with each other. The end of the first portion 172 has a screw hole that is fixed to the housing 110 by screws. The end of the second portion 174 away from the first portion 172 is connected with the sidewall 1364 of the frame 136. Furthermore, the auxiliary fixing element 170 is L-shaped. The first portion 172 is parallel to the extending element 160, the second portion 174 is parallel to the axial direction of the guiding structure 131, and the turning portion between the first portion 172 and the second portion 174 is adjacent to the pushing position of the elastic element 1346 of the transmitting structure 134 pushing the extending element 160. When the functional module 120 is retracted inside the housing 110, the extending element 160 is close to the first portion 172 of the auxiliary fixing element 170. At this time, the distance between the first portion 172 and the fixed guiding element 150 is slightly greater than the distance between the extending element 160 and the fixed guiding element 150. The guiding structure 131 is located between the second portion 174 of the auxiliary fixing element 170 and the rotating shaft 1324 of the driver 132, and the distance between the second portion 174 of the auxiliary fixing element 170 and the side wall 1366 of the frame 136 is approximately equal to the width of the driving member 1342 of the transmitting structure 134. That is to say, the transmitting structure 134 roughly occupies the accommodating space formed by the frame 136 and the second portion 174. In this way, the configuration of the lifting assembly 130 is concentrated, and the internal space of the electronic device 10 is saved to place other electronic components.

Figure 8:
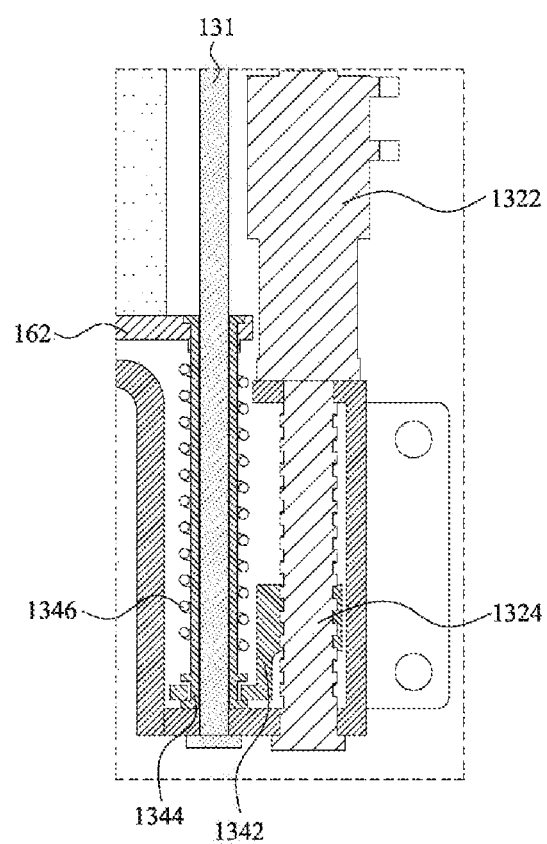
FIG. 8 is a cross-sectional view of a lifting assembly along line 8-8 in FIG. 6.
Figure 9:
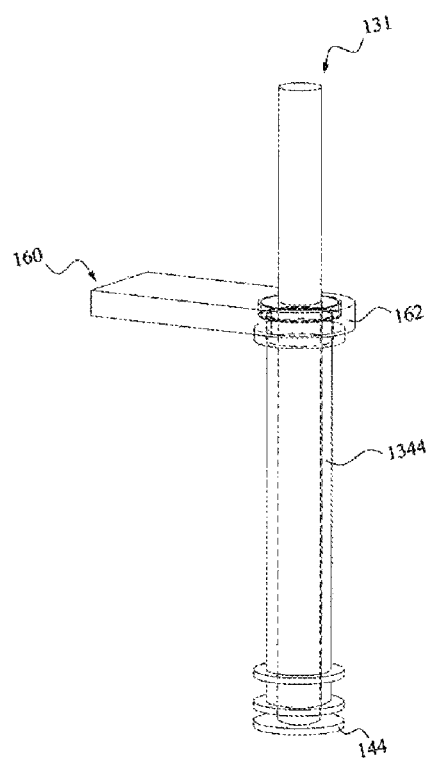
FIG. 9 is a perspective view of the driving collar and a part of an extending element in FIG. 8.

In addition, the driving member 1342 and the driving collar 1344 in FIG. 6 are not integrally formed, but are two-piece components that are engaged with each other. Please refer to FIG. 8 and FIG. 9. FIG. 8 is a cross-sectional view of the lifting assembly 130 of FIG. 6 taken along line 8-8. FIG. 9 is a perspective view of the driving collar 1344 and a portion of the extending element 160 of FIG. 8.

As shown in FIG. 8, the driving member 1342, the driving collar 1344, and the elastic element 1346 sleeve the guiding structure 131. The driving member 1342 is engaged to one end of the driving collar 1344, and the driving collar 1344 extends along the guiding structure 131 toward the direction of the functional module 120 (on the top of the drawing) and protrudes from the elastic element 1346, and the elastic element 1346 is movably surrounding the driving collar 1344. In the embodiment, the driving collar 1344 is a sleeve structure located outside the guiding structure 140 and within the elastic element 1346.

As shown in FIG. 9, in the embodiment, the driving ring 1344 sleeves on the guiding structure 131. The second end 144 is extending to the extending element 160 and is fixed to the first protruding portion 162. That is to say, the driving collar 1344 has a limiting function to prevent the extending element 160 from moving toward the opening 112 when the extending element 160 is not driven by the transmitting structure 134.

Figure 10:
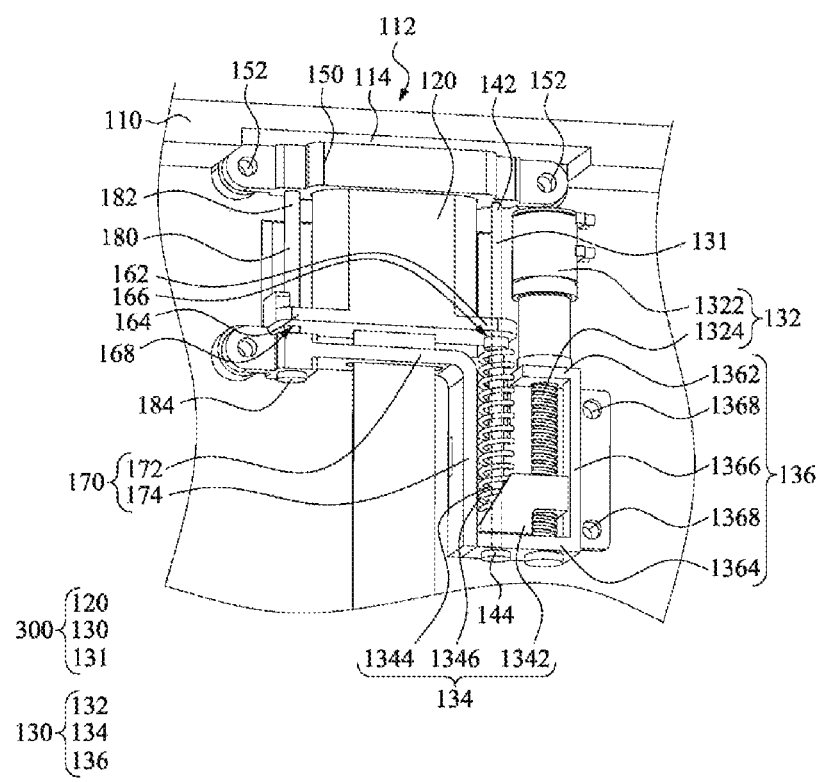
FIG. 10 is a perspective view of a functional assembly in accordance with further another embodiment.

Please refer FIG. 10. FIG. 10 is a perspective view of a functional assembly 300 in accordance with further another embodiment. The difference between the functional assembly 300 and the functional assembly 200 of the embodiment of FIG. 6 is that the functional module 120 of the functional assembly 300 directly connects or abuts to the elastic element 1346 of the transmitting structure 134. That is, the functional module 120 of the functional assembly 300 is considered to be integrally formed by molding the extending element 160 of the functional assembly 200 of FIG. 6 with the functional module 120. Moreover, in an embodiment, the driving collar 1344 is extending to the functional module 120 and is movably connected with the first protruding portion 162.

As described above, the functional module 120 and the lifting assembly 130 are integrated through the guiding structure 131. In this way, the overall volume of the lifting assembly is reduced by integrating a guide rail structure required for a conventional motor drive with a sliding structure required for sliding a retractable functional module to a shared guiding structure. In addition, since the body 1322 of the driver 132 of the lifting assembly 130 is adjacent to the functional module 120, the structural configuration of the functional assembly 300 is more concentrated, and the volume of the functional assembly 300 is further reduced.

In addition, since the driving collar 1344 movably engaged to the extending element 160 or the functional module 120, it is possible to avoid the functional module 120 sliding out of the housing 110 due to gravity or inertia when the user turning the electronic device 10 upside down or tilting the electronic device 10. Therefore, the functional module 120 is stably driven back or forth by the lifting assembly 130 to retract inside or extend outside the housing 110. Moreover, the function of the elastic element 1346 about cushion the user's pressing is not affected by the blocking relationship between the driving collar 1344 and the extending element 160 or the functional module 120.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A functional assembly, applied to an electronic device, the electronic device comprising a housing, the functional assembly comprising:
   a functional module; and
   a lifting assembly, fixed in the housing and configured to drive the functional module to move, wherein the lifting assembly further comprises:
   a guiding structure, configured to be fixed to the housing, and the functional module slidably connects to the guiding structure;
   a transmitting structure, slidably connected with the guiding structure and abutting the functional module; and
   a first driver, configured to be fixed to the housing and configured to drive the transmitting structure with the functional module to move along the guiding structure.

2. The functional assembly according to claim 1, wherein the guiding structure includes a first end and a second end, the first driver includes a body and a rotating shaft, the body is configured to drive the transmitting structure to move via the rotating shaft, the functional module and the body are adjacent to the first end of the guiding structure, and the transmitting structure and the rotating shaft are adjacent to the second end of the guiding structure.

3. The functional assembly according to claim 1, wherein the lifting assembly further includes a frame configured to be fixed to the housing, the first driver includes a shaft, the guiding structure is fixed to the frame, and the rotating shaft of the first driver is rotatably connected to the frame.

4. The functional assembly according to claim 1, further comprising:
   a rotating assembly, connected to the functional module, comprising:
   a connecting shaft, connected to the functional module; and
   a second driver, connected to the connecting shaft and configured to rotate the connecting shaft to drive the functional module to rotate.

5. The functional assembly according to claim 4, further comprising:
   an extending element, connected to the functional module through the connecting shaft, and having a first protruding portion with a first through hole, the functional module slidably connected to the guiding structure by the first through hole, and the extending element is abutting the transmitting structure of the lifting assembly, wherein the transmitting structure drives the functional module to slide along the guiding structure by pushing the extending element.

6. The functional assembly according to claim 1, wherein the guiding structure has a first end, and the lifting assembly further comprises:
   a fixed guiding element, configured to be fixed to the housing, wherein the functional module is slidably sleeved by the fixed guiding element, and the first end of the guiding structure is connected to the fixed guiding element.

7. The functional assembly according to claim 6, further comprising:
   a limiting structure, connected to the fixed guiding element, and the limiting structure and the guiding structure are respectively disposed on opposite sides of the functional module, the functional module is further slidably connected with the limiting structure.

8. The functional assembly according to claim 5, wherein the extending element further comprises a second protruding portion with a second through hole, the functional module is slidably connected to the guiding structure and the limiting structure by the first through hole and the second through hole, respectively.

9. The functional assembly according to claim 5, wherein the extending element further has a central through hole, and the connecting shaft of the rotating assembly connects to the functional module through the central through hole.

10. The functional assembly according to claim 5, wherein the connecting shaft further has two cap portions respectively located on opposite sides of the extending element, the cap portions clamp the extending element such that the connecting shaft is axially fixed to the cap portion.

11. The functional assembly according to claim 5, wherein the rotating assembly further includes a fixing plate fixed to a bottom surface of the extending element away from the functional module, and the second driver is fixed to the fixing plate.

12. An electronic device, comprising:
   a housing; and
   a functional assembly, comprising:
   a functional module, slidably connected with the guiding structure; and
   a lifting assembly, fixed in the housing and configured to drive the functional module to move, wherein the lifting assembly further comprises:
   a guiding structure, configured to be fixed to the housing, and the functional module is slidably connected to the guiding structure;
   a transmitting structure, slidably engaging with the guiding structure and abutting the functional module; and
   a first driver, configured to be fixed to the housing and configured to drive the transmitting structure with the functional module to move along the guiding structure.

13. The electronic device according to claim 12, wherein the guiding structure includes a first end and a second end, the first driver includes a body and a rotating shaft, the body is configured to drive the transmitting structure to move via the rotating shaft, the functional module and the body are adjacent to the first end of the guiding structure, and the transmitting structure and the rotating shaft are adjacent to the second end of the guiding structure.

14. The electronic device according to claim 12, wherein the lifting assembly further includes a frame configured to be fixed to the housing, the first driver includes a rotating shaft, the guiding structure is fixed to the frame, and the rotating shaft of the first driver is rotatably connected to the frame.

15. The electronic device according to claim 12, wherein the functional assembly further comprises a rotating assembly connected to the functional module, the rotating assembly comprises:
   a connecting shaft, connected to the functional module; and
   a second driver, connected to the connecting shaft and configured to rotate the connecting shaft to drive the functional module to rotate.

16. The electronic device according to claim 15, further comprising:
   an extending element, connected to the functional module through the connecting shaft, and having a first protruding portion with a first through hole, the functional module slidably connected to the guiding structure by the first through hole, and the extending element is abutting the transmitting structure of the lifting assembly, wherein the transmitting structure drives the functional module to slide along the guiding structure by pushing the extending element.

17. The electronic device according to claim 12, wherein the guiding structure has a first end, and the lifting assembly further comprises:
   a fixed guiding element, configured to be fixed to the housing, wherein the functional module is slidably sleeved by the fixed guiding element, and the first end of the guiding structure is connected to the fixed guiding element.

18. The electronic device according to claim 17, further comprising:
   a limiting structure, connected to the fixed guiding element, and the limiting structure and the guiding structure are respectively disposed on opposite sides of the functional module, the functional module is further slidably connected with the limiting structure.

19. The electronic device according to claim 16, wherein the extending element further comprises a second protruding portion with a second through hole, the functional module is slidably connected to the guiding structure and the limiting structure by the first through hole and the second through hole, respectively.

20. The electronic device according to claim 16, wherein the extending element further has a central through hole, and the connecting shaft of the rotating assembly connects to the functional module through the central through hole.

21. The electronic device according to claim 16, wherein the connecting shaft further has two cap portions respectively located on opposite sides of the extending element, the cap portions clamp the extending element such that the connecting shaft is axially fixed to the cap portion.

22. The electronic device according to claim 16, wherein the rotating assembly further includes a fixing plate fixed to a bottom surface of the extending element away from the functional module, and the second driver is fixed to the fixing plate.

* * * * *